(12) United States Patent
Baxi

(10) Patent No.: US 9,189,258 B2
(45) Date of Patent: *Nov. 17, 2015

(54) RECONFIGURABLE SENSING PLATFORM FOR SOFTWARE DEFINED INSTRUMENTATION

(71) Applicant: Intel Corporation, Santa Clara, CA (US)

(72) Inventor: Amit S. Baxi, Thane (IN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/149,044

(22) Filed: Jan. 7, 2014

(65) Prior Publication Data

US 2014/0122864 A1    May 1, 2014

Related U.S. Application Data

(63) Continuation of application No. 13/040,028, filed on Mar. 3, 2011, now Pat. No. 8,627,057.

(30) Foreign Application Priority Data

Dec. 22, 2010  (IN) .......................... 3069/DEL/2010

(51) Int. Cl.
*G06F 9/44* (2006.01)
*G06F 13/38* (2006.01)
*G06F 9/445* (2006.01)

(52) U.S. Cl.
CPC .......... *G06F 9/44505* (2013.01); *G06F 13/385* (2013.01)

(58) Field of Classification Search
CPC .......................... G06F 9/44505; G06F 13/385
USPC ................. 713/1, 100; 710/104, 105; 716/100
See application file for complete search history.

(56) References Cited

U.S. PATENT DOCUMENTS

| | | | |
|---|---|---|---|
| 5,887,165 A | 3/1999 | Martel et al. | 709/221 |
| 6,807,631 B2 | 10/2004 | Fuller et al. | 713/100 |
| 6,938,177 B1 | 8/2005 | Blemel | 713/500 |

(Continued)

FOREIGN PATENT DOCUMENTS

| | | |
|---|---|---|
| CN | 101727423 | 6/2010 |
| TW | I307469 | 3/2009 |

(Continued)

OTHER PUBLICATIONS

U.S. Office Action dated Jun. 4, 2013 for U.S. Appl. No. 13/040,028.

(Continued)

*Primary Examiner* — Stefan Stoynov
(74) *Attorney, Agent, or Firm* — KED & Associates LLP

(57) ABSTRACT

A reconfigurable sensor front-end includes a logic block having a storage circuit to store hardware description information and a reconfigurable block including a plurality of circuits. The plurality of circuits are to be set in a first configuration based on the hardware description information and are to be set in a second configuration when the hardware description information changes. The first hardware description information corresponds to a first sensor and the changed hardware description information corresponding to a second sensor.

20 Claims, 4 Drawing Sheets

(56) References Cited

U.S. PATENT DOCUMENTS

| | | | |
|---|---|---|---|
| 7,391,237 | B2 | 6/2008 | Fang et al. |
| 7,439,764 | B2 | 10/2008 | Twigg et al. |
| 8,149,102 | B1* | 4/2012 | Miller et al. ............... 340/506 |
| 2002/0108009 | A1 | 8/2002 | Borgatti et al. ............ 710/303 |
| 2004/0225415 | A1 | 11/2004 | Newberry |
| 2006/0055793 | A1* | 3/2006 | Adler et al. ............ 348/211.99 |
| 2006/0190882 | A1 | 8/2006 | Fong et al. |
| 2007/0198236 | A1 | 8/2007 | Kodosky et al. |
| 2007/0225954 | A1 | 9/2007 | Kodosky et al. |
| 2008/0278283 | A1 | 11/2008 | Slevin |
| 2009/0289615 | A1 | 11/2009 | Foley |
| 2011/0029254 | A1* | 2/2011 | Grittke et al. ................ 702/23 |

FOREIGN PATENT DOCUMENTS

| | | |
|---|---|---|
| TW | I317081 | 11/2009 |
| WO | 2012087595 A2 | 6/2012 |
| WO | 2012087595 A3 | 8/2012 |

OTHER PUBLICATIONS

International Preliminary Report on Patentability and Written Opinion received for PCT Patent Application No. PCT/US2011/064012, mailed on Jul. 4, 2013, 6 pages.

International Search Report and Written Opinion received for PCT Patent Application No. PCT/US2011/064012, mailed on Jun. 28, 2012, 9 pages.

Chinese Office Action for Application 201180062074.2 dated Mar. 30, 2015.

Taiwanese Office Action for Application 100145972 dated Feb. 13, 2015.

Taiwanese Search Report and English language translation for Application 100145972 dated Feb. 13, 2015.

* cited by examiner

RECONFIGURABLE SENSING PLATFORM FOR SOFTWARE DEFINED INSTRUMENTATION This application is a continuation application of U.S. application Ser. No. 13/040,028, filed Mar. 3, 2011 (now U.S. Pat. No. 8,627,057), which claims priority from Indian Patent Application No. 3069/DEL/2010, filed Dec. 22, 2010, the subject matter of which are hereby incorporated by reference.

FIELD

One or more embodiments described herein relate to sensing technology, reconfigurable hardware and software-control of electronic devices.

BACKGROUND

Many electronic devices (instruments) are equipped with interfaces adapted for coupling to sensors and peripheral devices. Sensors and peripheral devices are made by different manufacturers, are designed based on different specifications, and/or have different functional requirements. Consequently, the host electronic devices often must be equipped with custom hardware front-end circuits in order to interface to specific sensors and peripherals.

The use of dedicated, custom front-end hardware limits flexibility and increases cost, complexity, power consumption, size and makes the device single-functioned. This requires users to purchase multiple dedicated devices for multiple applications. A single device or platform which can dynamically reconfigures itself to synthesize front-ends to interface to multiple sensors and peripherals is currently not available.

DETAILED DESCRIPTION

Figure 1:
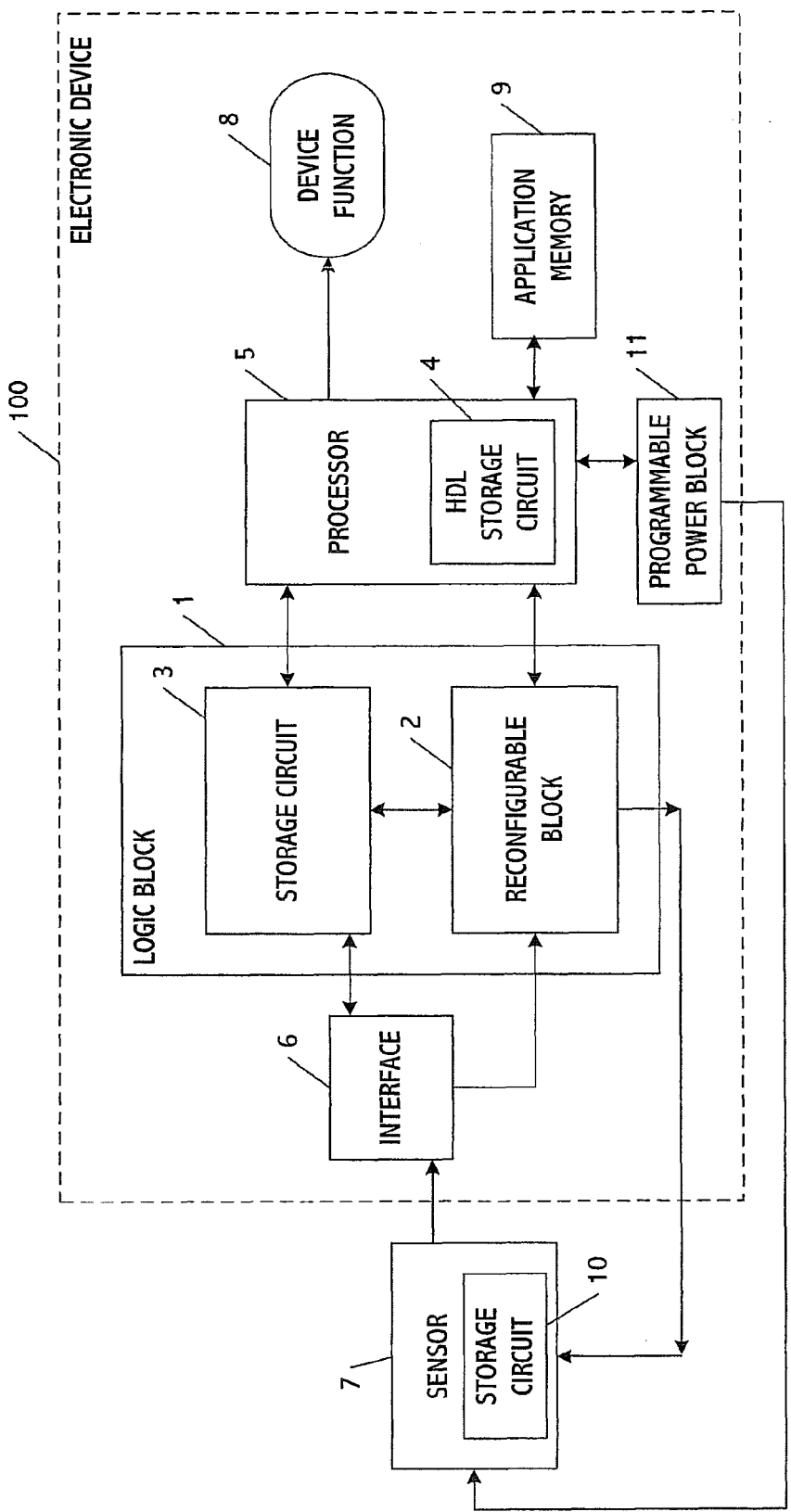
FIG. 1 is a diagram showing one embodiment of a logic block in an electronic device.

FIG. 1 shows one embodiment of a logic block 1 that is included within an electronic device 100. The electronic device may be any one of a number of stationary, mobile, or transportable devices including but not limited to a mobile phone including but not limited to mobile smart phones, a personal digital assistant, a multimedia player or other type of information terminal, a laptop, notebook, handheld or other type of computer, or a mobile interne device to name a few.

The logic block includes a reconfigurable block 2 and a storage circuit 3. The reconfigurable block includes one or more hardware circuits that can be configured in terms of their inputs, outputs, and functionality to perform a set of predetermined logic functions and/or actions. The block 2 may be configured based on hardware description information, which may include values and data held in the storage circuit and/or code stored in another memory circuit of the electronic device. The storage circuit 3 may include, for example, a plurality of registers for storing the values and data. Changing the hardware description information produces a corresponding change in the logical connections and functionality of block 2, and therefore in at least this way block 2 is considered to be reconfigurable.

In accordance with one implementation, the reconfigurable block may include any one of a number of programmable logic devices. One type of reconfigurable block is a Field Programmable Analog Array (FPAA) device. This type of device is an integrated device containing configurable analog blocks with interconnects between these blocks formed, for example, from current mode or voltage mode devices.

The current mode or voltage mode devices may include one or more operational amplifiers in combination with a programmable configuration of passive components which cooperate to perform summing, integrating, and/or other functions. The components may include programmable gain amplifiers, resistors, capacitors, logic gates, analog-to-digital converters, digital-to-analog converters, filters, analog multiplexers and analog switches, digitally configurable differential transconductance amplifiers, as well as other components. The capacitors may include switched capacitors and the resistors may be programmable resistors. The analog switches may be low-impedance CMOS and/or other types of switches. The FPAA may operate in continuous time mode or discrete time mode.

The reconfigurable block may also, or alternatively, include one or more programmable circuits made from floating gate complementary metal oxide semiconductor (CMOS) technology. The reconfigurable block may also, or alternatively, include a field-programmable gate array (FPGA), a complex programmable logic device (CPLD), and/or any one of a number of other reconfigurable, reprogrammable circuits that can perform both analog and digital functions.

In accordance with another implementation, the reconfigurable block may be implemented as a state machine, which, for example, may be used to perform various digital logic functions. The state machine may operate based on one or more state transition tables stored, for example, in the storage circuit 3 or another memory device.

Irrespective of the type(s) of device(s) used, the reconfigurable block 2 may be configured based on a set of specification values and data stored in storage circuit 3. The logic functions to be performed by the reconfigurable block are defined based on code corresponding to a hardware description language (HDL), which is implemented based on the stored specification values and data. The code corresponding to the HDL may be stored within the reconfigurable block, or may be stored outside of this block, for example, in a storage circuit 4 within or coupled to a processor 5 of the host electronic device 100.

The HDL code may be received by the electronic device in a variety of ways. For example, the code may be received by an external source or may be pre-programmed into the electronic device 100, or both. The code may cause, for example, various gates, switches, inputs and outputs to be connected, configured, and or activated in order to perform one or more predetermined functions. In this way, the HDL may be considered to synthesize, or model, the operation of one or more hardware circuits that otherwise would have to be custom-made in the device. The use of HDL programming, therefore, allows the functionality of the analog and logic blocks (and thus the electronic device) to be changed simply by changing the HDL and/or the specification values or data stored in the storage circuit 3.

In the example shown in FIG. 1, the electronic device is a mobile smart phone equipped with an interface 6 to be coupled to a sensor 7. The coupling may be achieved in a variety of ways. For example, the sensor may include a plug which fits into a receptacle of the interface. The coupling may also be achieved using various multi-pin connectors or a Universal Serial Bus (USB) connector. Another coupling is performed wirelessly, for example, using any one of a number of local communication standards including Bluetooth, WiFi, or the like.

The sensor 7 may be any one of a variety of sensors including but not limited to a bio-chemical sensor, a biometric sensor, a medical diagnostic sensor, a health sensor, a breathalyzer sensor, an air, food, or water quality testing sensor, or a sensor designed to perform an industrial or scientific application. Still other sensors include ones which are based on nanotechnology, a microelectromechanical system (MEMS), or micro-fluidics. These sensors may have analog or digital (e.g. SPI, UART, $I^2C$, USB) outputs and may also have analog or digital inputs for control functions.

Based on the HDL code the reconfigurable block dynamically synthesizes the analog, digital or mixed-signal front-end circuits required to interface the sensor to the electronic device 100. For some sensors, the reconfigurable block also synthesizes the analog or digital circuits which may connect to the sensor to form a feedback loop. This feedback loop may be required for control functions such as sensor linearization, sensitivity adjustment, offset compensation etc.

The signals received from the sensor are processed by the reconfigurable block and then sent to the processor, which performs one or more corresponding device functions 8. For example, the processor may execute an application stored in a memory 9 of the device. The application may be a downloadable application or one pre-stored in the device.

In accordance with one implementation, when the sensor may include a storage circuit 10 which stores the HDL, specification values and/or data for use in configuring the reconfigurable block 2. This information may be automatically transferred through interface 6 when, for example, the sensor is plugged into (or otherwise coupled with) the interface. The information is then stored in storage circuit 3 and/or HDL storage device 4, and reconfigurable block 2 may be automatically configured.

Alternatively, when the coupling between the sensor and interface is detected by processor 5, a message may be displayed on the device asking a user, for example, whether the sensor is to be activated. When a favorable response is received, the information may then be transferred for storage into the storage circuit 3 and/or HDL storage device 4. As in the previous example, the stored information is then used to automatically configure block 2. As shown in FIG. 1, a programmable power block 11 may also be included to show that the sensors may be excited or otherwise powered by direct current (DC), alternating current (AC), pulsed, or custom voltages or circuit patterns.

Figure 2:
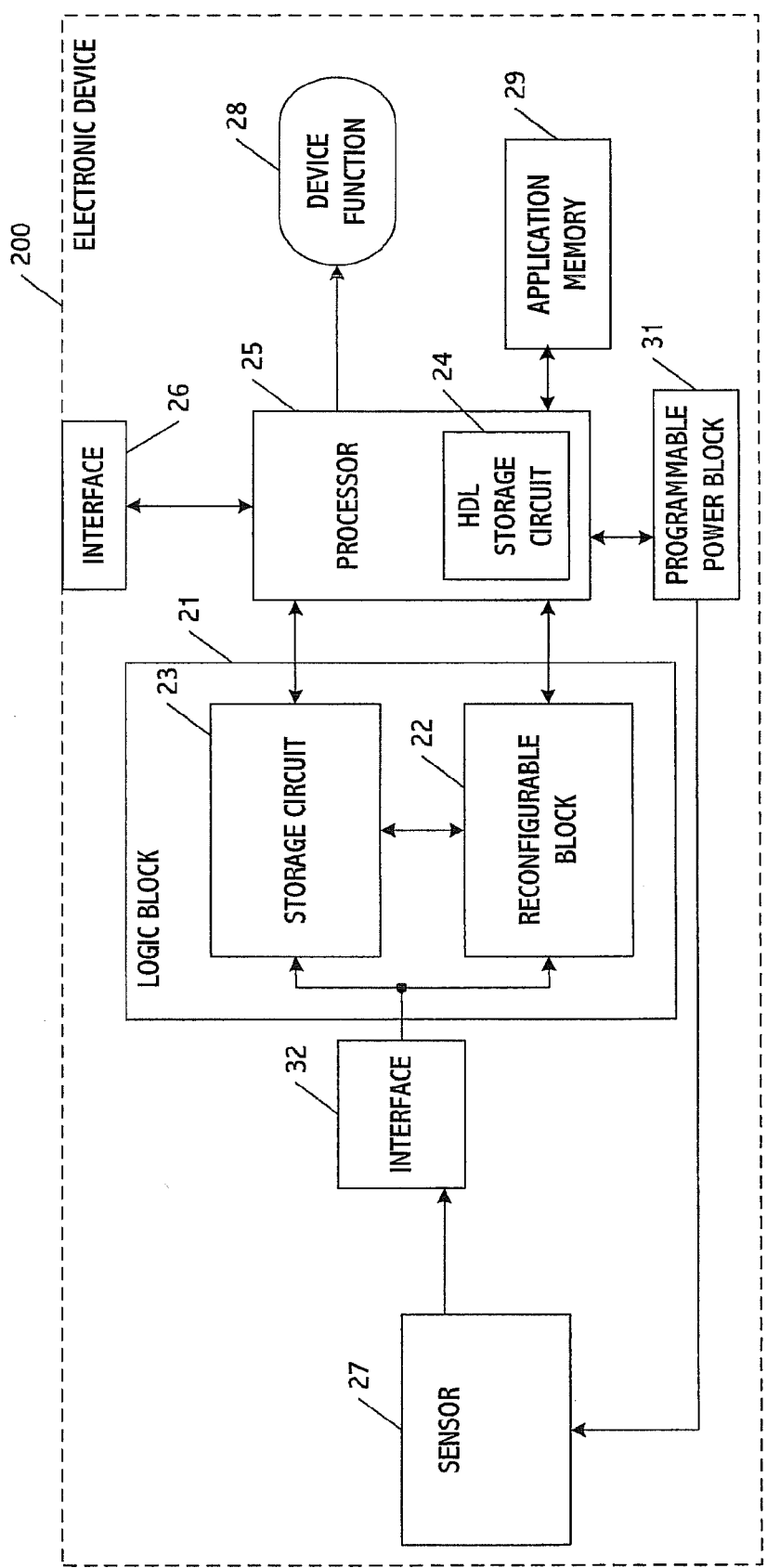
FIG. 2 is a diagram showing another embodiment of a logic block in an electronic device.

FIG. 2 shows another embodiment of a logic block 21 included within an electronic device 200. This embodiment may be similar to the embodiment of FIG. 1 in that it includes a reconfigurable block 22 and storage circuit 23. Also, the block is adapted to be coupled to a sensor 27, the signals processed by the reconfigurable block are output to a processor 25 which may include or be coupled to an HDL storage circuit 24, and the processor outputs signals for performing a device function 28.

Unlike FIG. 1, sensor 27 is included in the electronic device and coupled to the logic block through an interface 32. The HDL code, specification values and/or data for configuring the reconfigurable block 22 may be downloaded, for example, through a wireless interface or through a cable or other hardware connection. The wireless connection may, for example, be a Bluetooth or WiFi connection, and the cable or other hardware connection may be a USB connection, Ethernet connector, or another type of connection. Also, a programmable power block 31 similar to block 11 in FIG. 1 may be included.

In one implementation, this information may be downloaded with an application associated with the sensor, thereby effectively reprogramming the functionality of reconfigurable block 22 as to perform function 28. For illustrative purposes, a wireless interface 26 is shown for receiving the HDL code, specification values and/or configuration data, and an application memory 29 is included for storing an application which may be used in association with the function to be performed.

Figure 3:
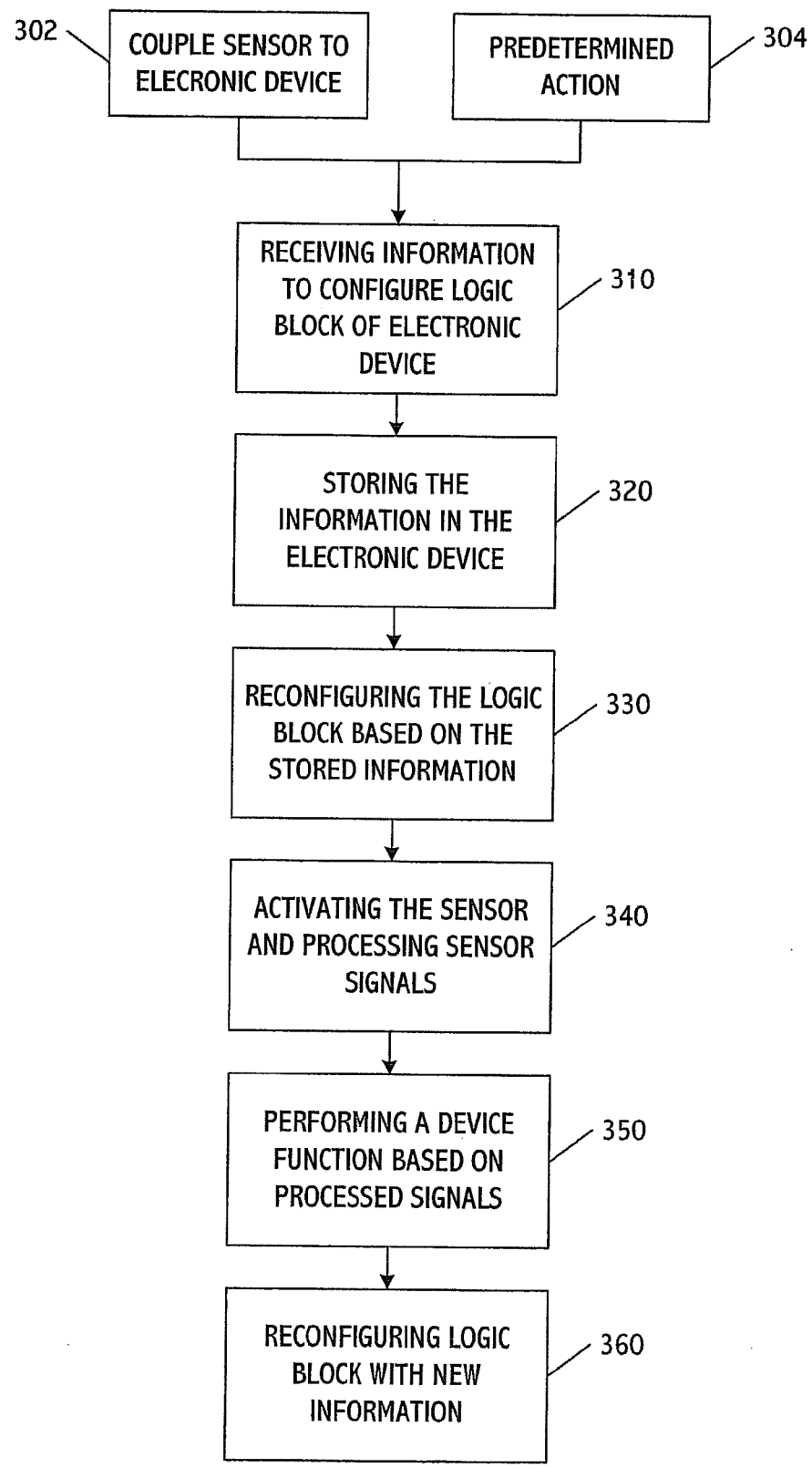
FIG. 3 is a diagram showing operates included in one embodiment of a method for reconfiguring a logic block for performing one or more functions in an electronic device.

FIG. 3 shows operations included in one embodiment of a method for reconfiguring a logic block for performing one or more functions in an electronic device. The electronic device and logic block may correspond to any of the embodiments described herein. (While the term "logic block" is used in the embodiments disclosed herein, this block may understood to be formed of analog circuits or a combination of digital or analog circuits and therefore the word logic as used herein should not be limited to a digital implementation only).

An initial operation includes receiving information for configuring the logic block. (Block 310). The information may be automatically received in response to detection of a sensor being plugged into or otherwise coupled with the electronic device. (Block 302). Alternatively, the information may be received after a predetermined action is taken. (Block 304).

The predetermined action may include accessing a website or mobile phone link or establishing a connection to another source, after which the information may be downloaded. As previously indicated, the information may include HDL code, specification values and/or data to be stored in the electronic device for configuring the reconfigurable block of the logic device. Previously stored HDL code, values or data (used, for example, to configure the block for another type of sensor) may be overwritten with the information received in Block 310, to thereby reconfigure the logic block to correspond to the sensor.

Once the information is received, the information is stored in the electronic device. (Block 320). As shown, for example, in FIGS. 1 and 2, specification values and/or data for reconfiguring the logic block may be stored in a storage circuit and HDL code may be stored in a separate storage area, for example, located within or coupled to a processor of the device.

The stored information is used to reconfigure the logic block. (Block 330). This may involve, for example, setting various gates, switches, operational amplifiers, analog components, inputs and outputs to be connected, configured, and or activated in order to perform one or more predetermined functions based on the stored HDL code, specification values, or data. Performing these settings causes the reconfigurable block to synthesize, or model, the operation of one or more hardware circuits that otherwise would have to be custom-made in the device.

Once the block has been reconfigured, the sensor is activated for use by supplying appropriate excitation voltage, current or other excitation patterns and signals received from the sensor are processed by the reconfigured block. (Block 340). For example, if the sensor is a glucose monitor, signals indicative of a user's glucose levels are processed by the logic block, which may involve, for example, converting the analog sensor signals into digital signals. Of course, other functions may be performed by the logic block as necessary.

Once the signals have been processed, the processor of the device may perform one or more predetermined additional functions. (Block 350). For example, the processor may compare the digital signals generated by the logic block and compare them to reference values in order to determine whether the glucose levels of the user are out of range. Information may then be displayed to the user indicating these levels.

Additional operations of the method include unplugging the sensor and attaching a new sensor along with associated HDL code, specification values, and/or data. (Block 360). This additional information is then used to reconfigure the logic block. Through this method, the same logic circuit may be reconfigured to correspond to different hardware circuits, in order to meet the requirements of each type of sensor coupled to the mobile device.

Figure 4:
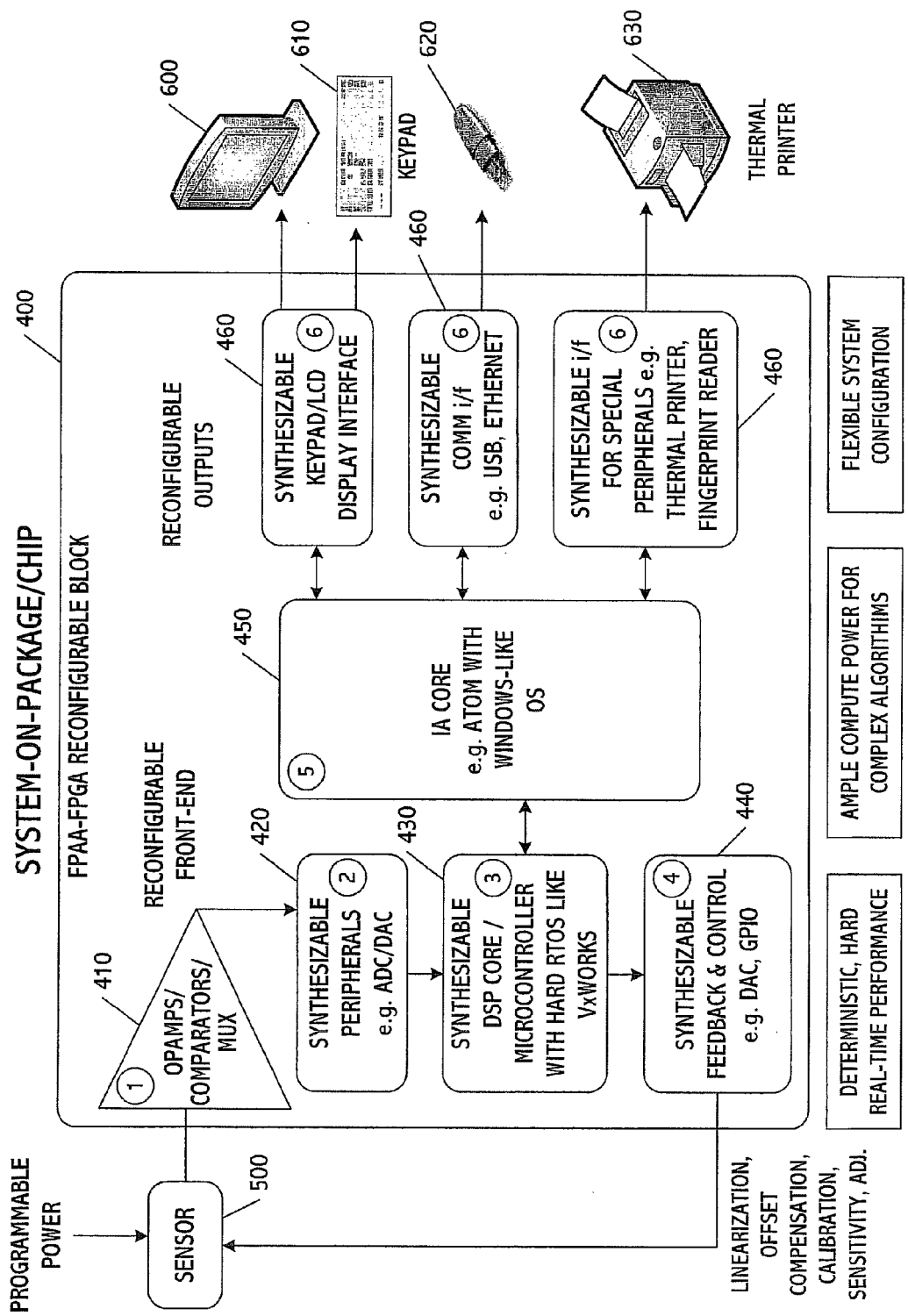
FIG. 4 is a diagram showing an embodiment of a reconfigurable logic block in an electronic device.

FIG. 4 shows another embodiment of a reconfigurable logic block 400 in an electronic device. This logic block includes a plurality of features, all of which may be incorporated within a single package (system-on-package) or on a same chip (system-on-chip, or SoC).

The reconfigurable logic block includes a reconfigurable analog block 410, one or more synthesizable peripherals 420, a synthesizable reconfigurable digital block 430, a synthesizable control block 440, a processor 450, and one or more synthesized output peripherals 460. The synthesized features of the reconfigurable block may be implemented using reconfigurable analog such as FPAA and/or reconfigurable digital logic such as FPGA and may be dynamically modeled based on the HDL code, specification values and data stored in the electronic device as previously discussed.

The reconfigurable analog block may include various analog hardware components forming a front end of block 400, to be coupled for receiving signals from a sensor 500. The hardware components may include, for example, one or more of operational amplifiers, programmable gain amplifiers, resistors, capacitors, filters, analog multiplexers, and analog switches. Also, the capacitors may be formed as switched capacitors, the resistors as programmable resistors, the analog switches as low-impedance CMOS switches, and the amplifiers may be digitally configurable differential or transconductance amplifiers. The reconfigurable analog block 410 may be formed using floating gate CMOS, scaled CMOS and/or standard CMOS or other analog technologies.

The synthesizable peripherals 420 may be dynamically modeled to perform a variety of functions. These functions may include, for example, functions of an analog-to-digital converter with a programmable resolution, a timer, a sampler, and a pulse width modular to name a few examples. The peripherals process signals from the reconfigurable analog block 410, and the result is output to the synthesizable digital block.

The synthesizable digital block 430 is a reconfigurable block which may dynamically model, for example, a digital signal processor or microcontroller core to run a real-time operating system. One example of such an operating system may be VxWorks.

The operating system may perform a variety of functions including sampling-digitization and preliminary data conditioning. The operating system may also communicate with processor 450, which, for example, may perform complex inference algorithms. FPGA architecture in this block may have, for example, a sea-of-gates and/or complex logic block (CLB) design. The state machine may be configured based on the stored specification values and data. Changing these values and data will therefore change the state machine and its attendant functionality.

The synthesizable control block 440 may be dynamically modeled to perform a variety of feedback and control functions. Examples include digital-to-analog conversion, general purpose input/output (GPIO) pin programming, linearization, offset compensation, calibration, and sensitivity adjustment functions. Signals generated by control block 440 may be fed back to control the sensor 500. The feedback signals generated by the control block may be either analog and/or digital. The digital feedback signals may be sent to the sensor through any one of a variety of communication interfaces including, for example, serial peripheral interface (SPI) or inter-integrated circuit ($I^2C$) interface. The sensor 500 may coupled to a programmable power source which, may be included, for example, within block 400. The programmable power source may operate in a manner similar to blocks 11 and 31 described relative to FIGS. 1 and 2.

The processor 450 may corresponds to the main processor of the electronic device. For example, if the electronic device is a notebook computer, the processor may be Intel's Atom processor which runs an operating system such as Windows, Linux, or Moblin, and in this regard may act as the main system computer. As indicated, processor 450 may perform more computationally challenging operations which the digital control block does not perform. These may include operations such as intelligent algorithms, adaptive digital signal processing, feature extraction, pattern matching, data fusion and machine learning.

The reconfigurable logic block may also dynamically model hardware interfaces to a variety of system peripherals based on the stored HDL code, specification values and/or data. For example, the reconfigurable block may synthesize hardware circuit for driving a display 600 of or coupled to the electronic device, for driving a customized keypad 610 of or coupled to the electronic device, for driving a communication interface 620 (e.g., universal asynchronous receiver/transmitter (UART) or USB) of the device, or for driving a printer 630 or bar code reader of or coupled to the electronic device. The display may be a liquid crystal display of various resolutions and sizes or an alphanumeric LED display.

Another embodiment provides a computer-readable medium having code sections for performing operations of the method described herein, as well as for synthesizing the various components of the reconfigurable logic block in accordance with the embodiments described herein. The code sections may correspond to different HDL code sections or may correspond to other code sections stored in the electronic device.

One example of the computer-readable medium may be one that stores set of instructions for controlling an electronic device. The set of instructions may include a first code section to store hardware description information of sensor front-end circuit from a first sensor, a second code section to set a reconfigurable block in a first configuration based on the stored hardware description information, a third code section to control the reconfigurable block to process signals from the first sensor, and a fourth code section to perform a function of the electronic device based on the processed signals output from the reconfigurable block. The first code section may store the hardware description information from the first sensor automatically after the first sensor is detected to be removably coupled to the electronic device.

In addition, the set of instructions may include a fifth code section to store hardware description information from a second sensor, a sixth code section to overwrite the hardware description information received from the first sensor with the hardware description received from the second sensor, and a seventh code section to configure the reconfigurable block based on the hardware description information from the second sensor.

In accordance with one embodiment, the reconfigurable logic block synthesizes a hardware front-end for different types of sensors that may be coupled to or included within the electronic device. The synthesis is performed using the HDL or other type of hardware specification or synthesis code. The code may, for example, be provided by the sensor manufacturer. For example, the sensor vendor may supply a hardware driver bit-stream that would synthesize the front end of the device when the sensor is plugged in. Adding new features to the sensor functionality would merely require changing only the hardware specification code and any associated algorithms to be performed by the processor.

The reconfigurable logic block may have plug-and-play functionality for a variety of sensors, i.e., each time a new sensor is plugged into the electronic device (e.g., mobile smart phone or internet device), the logic block is reconfigured to support functionality of the different sensor. Thus, only one logic block may be used and reconfigured to support multiple sensors.

The manufacturer hardware specification code may be stored in the sensor and transferred to the electronic device when the sensor is plugged in, or may be obtained from a downloaded application which, when activated, causes the logic block to be reconfigured for the sensor. When electronic device includes multiple sensors, the HDL code for each sensor may be automatically loaded from an internal storage device to reconfigure the logic block, for example, whenever an application is initiated corresponding to that sensor. If multiple similar or distinct sensors are plugged into the electronic device or are integrated into the electronic device, the reconfigurable block may synthesize multiple similar or distinct front-end circuits simultaneously depending on the HDL code.

In the aforementioned embodiments, the logic block and/or electronic device may be modified to be coupled to a plurality of plug-in type sensors simultaneously, for example, by including a plurality of corresponding jacks, ports, or plugs. The logic block may then control different peripheral devices based on respective ones of those sensors simultaneously or sequentially.

In addition, in the aforementioned embodiments, the reconfigurable sensor front-end can either be integrated into a System on Chip or System on Package or can be designed using discrete components. Moreover, the aforementioned embodiments may be included within a mobile device or may be on a wired/wireless node external to a mobile device.

Any reference in this specification to an "embodiment" means that a particular feature, structure, or characteristic described in connection with the embodiment is included in at least one embodiment. The appearances of such phrases are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc.

Although the embodiments have been described with reference to a number of illustrative embodiments, it should be understood that numerous other modifications and embodiments can be devised by those skilled in the art that will fall within the spirit and scope of the principles of the embodiments herein. More particularly, reasonable variations and modifications are possible in the component parts and/or arrangements of the subject combination arrangement within the scope of the foregoing disclosure, the drawings and the appended claims without departing from the spirit of the embodiments herein. In addition to variations and modifications in the component parts and/or arrangements, alternative uses will also be apparent to those skilled in the art.

I claim:

1. An electronic device comprising:
a reconfigurable device to couple to any one of a plurality of sensors, the reconfigurable device to operate in a first configuration in response to a first type of sensor to couple to the reconfigurable device, and the reconfigurable device to operate in a second configuration in response to a second type of sensor to couple to the reconfigurable device, the reconfigurable device to operate in the first configuration based on first hardware description information, and the first hardware description information is to be automatically downloaded from the first type of sensor when the first type of sensor is to couple to the reconfigurable device.

2. The electronic device of claim 1, wherein the reconfigurable device includes a field-programmable gate array.

3. The electronic device of claim 1, wherein the reconfigurable device includes a plurality of reprogrammable circuits.

4. The electronic device of claim 1, wherein the reconfigurable device includes a field programmable analog array device.

5. The electronic device of claim 1, wherein the reconfigurable device to operate in the second configuration based on second hardware description information.

6. The electronic device of claim 5, wherein the second hardware description information to be received from an external source.

7. The electronic device of claim 1, wherein the first hardware description information includes code written in a predetermined hardware description language.

8. The electronic device of claim 5, wherein the second hardware description information is to be automatically downloaded from the second type of sensor when the second type of sensor is to couple to the reconfigurable device.

9. The electronic device of claim 1, wherein an interface to wirelessly couple a sensor to the reconfigurable device.

10. An electronic device, comprising:
a first sensor;
a sensor interface to couple to the first sensor; and
a reconfigurable device to operate in a first configuration in response to the first sensor to correspond to a first type of sensor, and the reconfigurable device to operate in a second configuration in response to a sensor to correspond to a second type of sensor, the reconfigurable device to operate in the first configuration based on first hardware description information, and the first hardware description information is to be automatically downloaded from the first sensor when the first sensor is to couple to the reconfigurable device.

11. The electronic device of claim 10, wherein the reconfigurable device to operate in the second configuration based on second hardware description information.

12. The electronic device of claim 11, wherein the second hardware description information to be received from an external source.

13. The electronic device of claim 11, wherein the second hardware description information is to be automatically downloaded from the second type of sensor when a second sensor is to couple to the sensor interface.

14. The electronic device of claim 10, wherein:
the first hardware description information is to be automatically downloaded from the first sensor when the first sensor is coupled to the sensor interface, and
second hardware description information is to be automatically downloaded from a second sensor when the second sensor is coupled to the sensor interface, the second hardware description information overwriting the first hardware description information to set the reconfigurable device into the second configuration.

15. The electronic device of claim 10, further comprising:
an application memory to store an application to be used with signals output from the reconfigurable device in order to perform a predetermined function; and
a wireless interface to receive the application for storage into the application memory.

16. The electronic device of claim 10, wherein the reconfigurable device is to process signals from the first sensor to control a first peripheral device and to process signals from a second sensor to control a second peripheral device.

17. A system comprising:
at least one sensor;
a reconfigurable device to couple to any one of a plurality of sensors, the reconfigurable device to operate in a first configuration in response to a first type of sensor to couple to the reconfigurable device, and the reconfigurable device to operate in a second configuration in response to a second type of sensor to couple to the reconfigurable device, the reconfigurable device to operate in the first configuration based on first hardware description information, and the first hardware description information is to be automatically downloaded from the first type of sensor when the first type of sensor is to couple to the reconfigurable device; and
a processor to receive information from the reconfigurable device to perform a function based on the received information.

18. The system of claim 17, wherein the reconfigurable device to operate in the second configuration based on second hardware description information.

19. The system of claim 18, wherein the second hardware description information to be received from an external source.

20. The system of claim 18, wherein:
the first hardware description information is to be automatically downloaded from a first sensor when the first sensor is coupled to an interface, and
the second hardware description information is to be automatically downloaded from a second sensor when the second sensor is coupled to an interface, the second hardware description information overwriting the first hardware description information to set the reconfigurable device into the second configuration.

\* \* \* \* \*